UNITED STATES PATENT OFFICE.

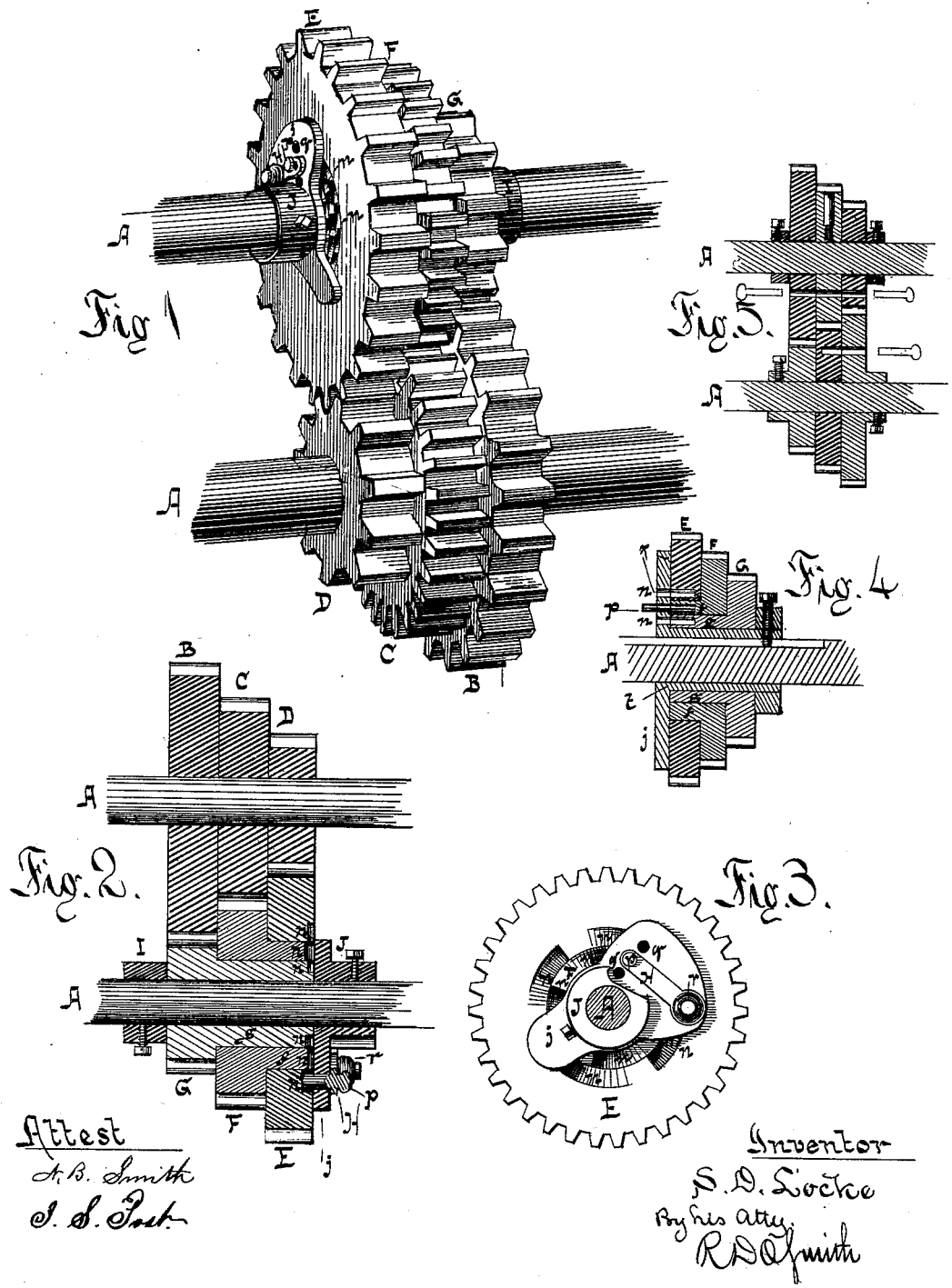

SYLVANUS D. LOCKE, OF HOOSICK FALLS, NEW YORK.

IMPROVEMENT IN CHANGE-SPEED GEARS.

Specification forming part of Letters Patent No. 204,585, dated June 4, 1878; application filed April 17, 1878.

*To all whom it may concern:*

Be it known that I, SYLVANUS D. LOCKE, of Hoosick Falls, in the county of Rensselaer and State of New York, have invented a new and Improved Mode of Change-Speed Gears, of which the following is a full and exact description.

Provision for changing speed is one of the most common features in operative mechanics. Where motion is transmitted through belts speed is generally changed by shifting the same belt from one pair of pulleys having a certain relation as to diameter to another pair having a different relation as to diameter; but when motion is transmitted by means of gear-wheels the same simple proceeding cannot be employed. The general practice is to remove one or more of the transmitting-gears, and replace the same with others of different diameters. This involves considerable trouble and liability of loss of the detached parts. Many contrivances have been devised to obviate the necessity of detaching removable gears and replacing them with other gears different in relative diameters.

I am aware that gears have been loosely mounted upon a hollow slit shaft, provided with a sliding key, capable of being moved along said slit, so as to engage with one or another of said gears. This method weakens the shaft, and requires a great increase of weight to restore its strength.

I am not aware that a series of gears of different diameters have been arranged loosely upon a solid shaft, with external means for locking either one of said gears to its shaft at will, and thereby to transmit motion through either of said gears, as may be desired.

That others may fully understand my invention, I will particularly describe it, having reference to the accompanying drawings, wherein—

Figure 1 is a perspective representation of a set of change-speed gears arranged in accordance with my invention. Fig. 2 is a longitudinal section of the same. Fig. 3 is an elevation of the clutch end of the same. Figs. 4 and 5 represent modifications of the same.

Of the shafts A A, one is the line or driving shaft, and the other is the counter or driven shaft. For the purposes of this invention it is immaterial which shaft is line or which is counter. B C D are three gear-wheels, which are fast upon their shaft. They are of different diameters of pitch-line, and represent a series which may include two or more, and may be either spur or bevel. Upon the opposite shaft there are corresponding gears E F G, in mesh with the gears B C D, but all loose and free to turn independent of the shaft. I desire to lock either one of said loose wheels to its shaft without weakening said shaft by cutting or perforating it, and I therefore provide said wheels with hubs $g f$, fitted one within the other, so that each succeeding wheel turns upon the hub of the adjacent preceding wheel, and the faces of said hubs are brought to the same plane. If three wheels are employed there will be two hubs, and they will terminate upon the plane of the outer face of the third wheel, as shown. Whatever the number of the wheels, those having hubs will be one less than the whole number of the series.

The end faces of the hubs all terminating on the same plane may have a clutch device operating in that plane and common to all of them. Such a device is shown at H, though I do not propose to limit myself to the structure or arrangement shown.

The wheels E F G may be confined in position by collars I J, the latter of which has a flange, $j$, broad enough to cover the ends of the hubs and a part of the last wheel of the series, so that they are all confined in position.

The ends of the hubs and the outer face of the wheel E (last wheel of the series) are provided with notches $n$, holes, or other equivalent means of engagement, and a pin or other equivalent device may be inserted through a suitable hole, $q$, in said flange $j$ to engage with one of the notches $n$ in the wheel which it is desired to lock fast to its shaft. I think it convenient to attach said pin $p$ to a pivoted clutch-arm, H, which is provided with a rubber spring, $r$, to keep it depressed and the pin in engagement. To shift the clutch, it is only necessary to pull the pin $p$ out of the hole $q$ in which it has been placed, and swing the arm H until said pin may enter another clutch-hole of the series, and the new engagement will immediately take place.

It is manifest the clutch-pin may be used singly, as shown in Fig. 4, or may be mounted on a swinging arm with or without springs, and may be arranged in a great variety of ways. I therefore do not desire to limit myself to the precise method, except so far as to require that the devices shall be external to the shaft, and shall not cause the same to be weakened.

In Fig. 4 the loose wheels are shown mounted upon a sleeve, t, which is interposed between them and the shaft, and arranged to slide upon said shaft, with a spline and feather or other means of preventing rotation while permitting free lateral movement.

In Fig. 5 a modified arrangement is shown, the fast and loose wheels being arranged alternately upon the same shaft, but opposedly upon the two shafts.

It is manifest the flange j may be made circular in periphery, and gear-teeth cut in its edge, so as to constitute it a fixed wheel; and that opposite to and in mesh with it, on the other shaft, a loose wheel may be placed; and that these two may be coupled by locking said loose wheel to the fast wheel beside it by a method shown in Figs. 4 and 5, or by any other suitable device.

Having described my invention, what I I claim as new is—

1. The several wheels E F G, provided with hubs fitted one over the other, as set forth, so that the ends of said hubs may all terminate on the same plane, combined with a clutch mechanism common to all of said wheels, whereby either one may be locked to its shaft, as set forth.

2. The flange or clutch-plate j, rigidly secured to the shaft, and extended laterally to cover the clutch-faces of the several wheels, as set forth, provided with holes q opposite the several clutch-faces, combined with a clutch-pin, p, actuated by a spring to keep it in place.

3. The clutch-plate or flange j, as set forth, provided with the holes q, combined with the pin p, mounted in the end of an arm, H, which is provided at its pivot end with a spring, r, as set forth.

4. A series of wheels, E F G, having concentric hubs, substantially as described, combined with a sliding sleeve-bearing, t, upon which said wheels are mounted, so that the whole series may move laterally along the shaft, as set forth.

5. A series of wheels, more or less of which are gear-wheels, part fast and part loose, the loose wheels capable of being locked to the fast wheels, so as to change the speed combination at will, as and for the purpose set forth.

6. A system of change-gears, substantially as shown, combined with a clutch mechanism external to the shaft, whereby either of said wheels may be individually and separately locked to its shaft to change the speed transmitted.

S. D. LOCKE.

Witnesses:
R. D. O. SMITH,
I. S. POST.